US009403582B2

(12) United States Patent
Moran

(10) Patent No.: US 9,403,582 B2
(45) Date of Patent: Aug. 2, 2016

(54) BOAT BUMPER

(71) Applicant: Michael Patrick Moran, Fort Myers Beach, FL (US)

(72) Inventor: Michael Patrick Moran, Fort Myers Beach, FL (US)

( * ) Notice: Subject to any disclaimer, the term of this patent is extended or adjusted under 35 U.S.C. 154(b) by 0 days.

(21) Appl. No.: 14/642,570

(22) Filed: Mar. 9, 2015

(65) Prior Publication Data

US 2015/0251737 A1    Sep. 10, 2015

Related U.S. Application Data

(60) Provisional application No. 61/950,477, filed on Mar. 10, 2014, provisional application No. 62/009,142, filed on Jun. 6, 2014, provisional application No. 62/019,013, filed on Jun. 30, 2014.

(51) Int. Cl.
*B63B 59/02* (2006.01)
*E02B 3/26* (2006.01)

(52) U.S. Cl.
CPC .. *B63B 59/02* (2013.01); *E02B 3/26* (2013.01)

(58) Field of Classification Search
CPC combination set(s) only.
See application file for complete search history.

(56) References Cited

U.S. PATENT DOCUMENTS

| 4,343,258 | A | * | 8/1982 | Belvedere | E02B 3/26 |
| | | | | | 114/219 |
| 4,584,958 | A | * | 4/1986 | Green | B63B 59/02 |
| | | | | | 114/219 |

FOREIGN PATENT DOCUMENTS

| DE | 3413477 A1 * | 10/1985 | B63B 1/121 |
| GB | 946811 A * | 1/1964 | B63B 59/02 |

* cited by examiner

*Primary Examiner* — Benjamin Fiorello
*Assistant Examiner* — Kyle Armstrong
(74) *Attorney, Agent, or Firm* — George F. Wallace

(57) ABSTRACT

A boat bumper is positioned between a nautical structure and a nautical vessel. A main body includes a concave portion and a convex portion. The concave portion abuts the nautical structure and the convex portion abuts the nautical vessel. A boat bumper can optionally include an auxiliary bumper having a first convex part and a second convex part. The main body and auxiliary bumper engage to form a macro bumper with the first convex part abutting the concave portion. Alternatively, a main body includes a male connector with a male shape and a female cavity complementarily shaped to the male shape such that the male connector of another bumper fits within the female cavity to connect the bumpers together. A male shape can be keyed and/or tapered in at least one direction.

12 Claims, 7 Drawing Sheets

BOAT BUMPER

CROSS-REFERENCE TO RELATED DOCUMENTS

This document is related to, incorporates by reference in its entirety, and claims the priority benefit, of the following:

U.S. Provisional Patent Application Ser. No. 61/950,477, entitled "Boat Bumper System," and filed on Mar. 10, 2014 by Michael Patrick Moran;

U.S. Provisional Patent Application Ser. No. 62/009,142, entitled "Boat Bumper System," and filed on Jun. 6, 2014 by Michael Patrick Moran; and U.S. Provisional Patent Application Ser. No. 62/019,013, entitled "Boat Bumper System," and filed on Jun. 30, 2014 by Michael Patrick Moran.

FIELD OF THE INVENTION

The present invention relates to boat bumpers.

BACKGROUND OF THE INVENTION

Boat bumpers are used in conjunction with a nautical vessel, such as a boat, ship, personal watercraft, etc. (collectively, "nautical vessel" or "boat"). When a boat is attached or fixed to a nautical structure (such as a dock, piling, seawall, another boat, quay wall, etc.), one or more bumpers can be disposed between one or more sides of a boat and the nautical structure to protect such one or more sides and/or the structure from damage arising from the boat contacting the structure by absorbing at least a portion of any kinetic energy arising therebetween. Bumpers have been manufactured from rubbers, elastomers, and plastics.

SUMMARY OF THE INVENTION

The present invention provides an improved boat bumper.

In an exemplary embodiment of the present invention, a modular bumper can include a main body, formed of a flexible material, and having a concave portion and a convex portion. In an exemplary aspect, the concave portion can face, and abut, the nautical structure (such as a piling, for example) and the convex portion can face the nautical vessel.

In an exemplary aspect, a main body can include at least one main body aperture that extends through said main body.

In another exemplary aspect, a boat bumper can further include an auxiliary bumper, formed of one of the flexible material and another flexible material, and having a first convex part and a second convex part, such that the main body and auxiliary bumper can engage to form a macro bumper with the first convex part abutting the concave portion.

In yet another exemplary aspect, a main body include at least one main body aperture and an auxiliary bumper can include at least one auxiliary bumper aperture that aligns with the at least one main body aperture when the main body and the auxiliary bumper are engaged.

In still yet another exemplary aspect, a main body can include at least one main body strap crease and an auxiliary bumper can includes an auxiliary bumper strap crease that aligns with the main body strap crease when the main body and the auxiliary bumper are engaged.

In a further exemplary aspect, a main body can include a male connector having a male shape and a female cavity complementarily shaped to the male shape, such that the male connector of another bumper can fit within the female cavity to connect the bumpers together.

In still a further exemplary aspect, a male shape can be keyed and/or tapered in at least one direction.

In still yet another exemplary aspect, a male connector can includes a male connector top having a top width and a male connector neck having a neck width less than the top width.

In another exemplary aspect, at least one of the male connector top and the male connector neck can be keyed and/or tapered in at least one direction.

In yet another exemplary aspect, a main body can include at least one main body aperture that extends through the male connector and to the female cavity.

In still another exemplary aspect, a main body can include at least one main body extension cavity and an auxiliary bumper can include at least one auxiliary bumper extension that fits within the main body extension cavity when the main body and the auxiliary bumper are engaged.

In still a further exemplary aspect, a main body can include at least one main body aperture that extends through the male connector and to the female cavity, an at least one auxiliary bumper extension can include at least one extension aperture that extends through the at least one auxiliary bumper extension, and the at least one main body aperture and the at least one extension aperture can are align when the main body and the auxiliary bumper are engaged.

In another exemplary embodiment, a boat bumper can include a main body, formed of a flexible material, and having a male connector with a male shape and a female cavity complementarily shaped to the male shape such that the male connector of another bumper fits within the female cavity to connect the bumpers together.

In an exemplary aspect, the main body can include at least one main body aperture that extends through the main body.

In another exemplary aspect, the main body can include at least one main body aperture that extends through the male connector and to the female cavity.

In yet another exemplary aspect, a male shape can be keyed and/or tapered in at least one direction.

In still another exemplary aspect, a male connector can include a male connector top having a top width and a male connector neck having a neck width less than the top width.

In still yet another exemplary aspect, at least one of the male connector top and the male connector neck can keyed and/or tapered in at least one direction.

DETAILED DESCRIPTION

Figure 1A:
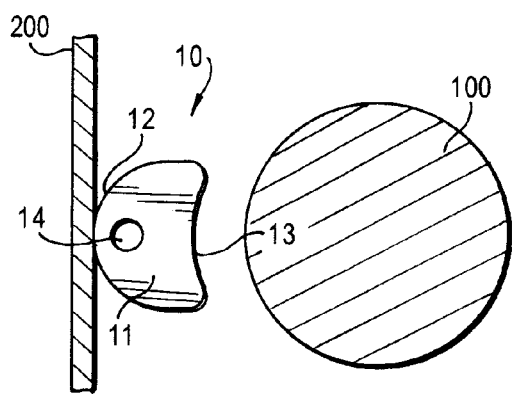
FIG. 1a illustrates an exemplary boat bumper positioned between a nautical vessel and a nautical structure.

It is an object of the present invention to provide a self-leveling boat bumper system having a plurality of embodiments, which are described, and are to be broadly interpreted, via the disclosure herein.

It should be noted that this disclosure includes a plurality of embodiments each having a plurality of elements and/or aspects, and such elements and/or aspects need not necessarily be interpreted as being conjunctively required by one or more embodiments of the present invention. In particular, all combinations of elements and/or aspects can enable a separate embodiment of the present invention, which may be claimed with particularity in this or any future filed Patent Applications. Moreover, such elements and/or aspects disclosed herein, whether expressly or implicitly, are to be construed strictly as illustrative and enabling, and not necessarily limiting. Therefore, it is expressly set forth that any elements and/or aspects, independently or in any combination of one of more thereof, are merely illustratively representative of one or more embodiments of the present invention and are not to be construed as necessary in a strict sense.

Further, to the extent the same element and/or aspect is defined differently anywhere within this disclosure, whether expressly or implicitly, the broader definition is to take absolute precedence, with the distinctions encompassed by the narrower definition to be strictly construed as optional.

Illustratively, perceived benefits of the present invention can include functional utility, whether expressly or implicitly stated herein, or apparent herefrom. However, it is expressly set forth that these benefits are not intended as exclusive. Therefore, any explicit, implicit, or apparent benefit from the disclosure herein is expressly deemed as applicable to the present invention.

The present invention provides a boat bumper having a plurality of embodiments.

It should be noted that each element and/or aspect of the embodiments described herein are illustratively shown, and therefore, can be provided in any desired shape and/or size that are functionally compatible with the present invention as described, and as expressly stated, are not limited to any particular shape or size illustratively described herein. Accordingly, exemplary shapes and/or sizes can include any shape or size having one or more geometric shapes, whether having symmetric or asymmetric portions, and without shape or size limitations relative to other elements unless necessary to the functionality of the present invention.

Further, it is expressly set forth that any structural element and/or aspect described herein can be formed from any one or more desired materials that provide functional compatibility with the respective component and/or the respective aspect related thereto. Thus, any one or more of a plastic, rubber, metal, wood, elastomer, crystalline material, man-made material, naturally-occurring material, synthetic, etc. may be utilized insofar as respectively compatible. Further, the aspect of being flexible is intended to encompass any material or combination of materials that can absorb energy arising from a bumper being in contact with a nautical vessel and a nautical structure without breaking, cracking, or fracturing, and can resume its originally provided shape at least substantially.

FIG. 1a illustrates, from a top-down perspective, the environment of the present invention, in which a boat bumper according to the present invention is positioned between a nautical structure 100 and a nautical vessel 200 (a portion thereof being shown).

As illustrated, in an exemplary embodiment of the present invention, a boat bumper can include a main body 10 having a convex portion 12 and a concave portion 13, with the bumper being oriented so that the concave portion can abut nautical structure 100 and the convex portion can abut nautical vessel 200. In an exemplary aspect, concave portion 13 can resist lateral movement of the boat bumper when abutting nautical structure 100.

In another exemplary aspect, main body 10 (including auxiliary bumper described herein) can be formed of any one or more flexible materials that can absorb energy arising from contact with a nautical structure 100 and a nautical vessel 200.

As further illustrated, main body 10 can optionally include at least one main body aperture 14 that extends through the main body. Notably, aperture 14 can be positioned in any orientation, whether vertically (as illustrated), horizontally, or any degree therebetween.

Figure 1B:
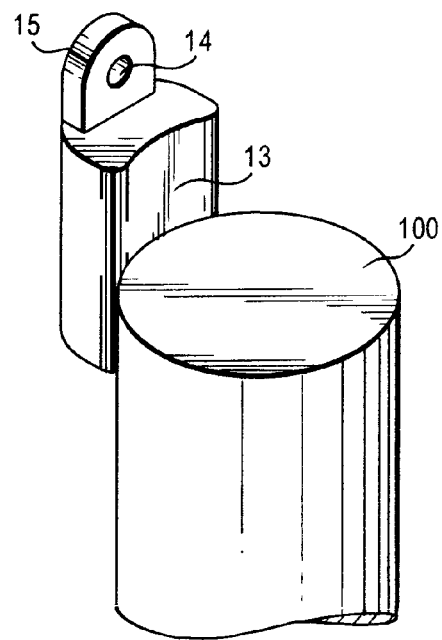
FIG. 1b illustrates an exemplary boat bumper having an optional main body aperture and ear.

As illustrated in FIG. 1b, main body 10 can optionally include an ear 15, which can include main body aperture 14 and provide a means for securing a rope to the bumper.

Figure 1C:
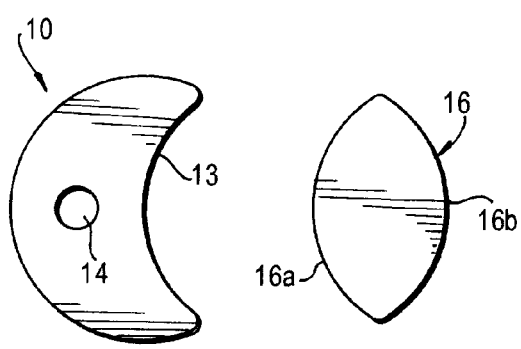
FIG. 1c illustrates an exemplary boat bumper having an optional auxiliary bumper.

As illustrated in FIG. 1c, a boat bumper can further include an optional auxiliary bumper 16 having a first convex part 16a and a second convex part 16b. As illustrated, main body 10 and auxiliary bumper 16 can engage to form a macro bumper with first convex part 16a abutting concave portion 13. Notably, first convex part 16a and concave portion 13 can be particularly shaped so as to form-fit with each other, as illustrated. Further notably, main body 10 and auxiliary bumper 16 can be particularly shaped such that when engaged, a resulting macro bumper can have a desired shape, such as a cylinder, as illustrated.

Figure 1D:
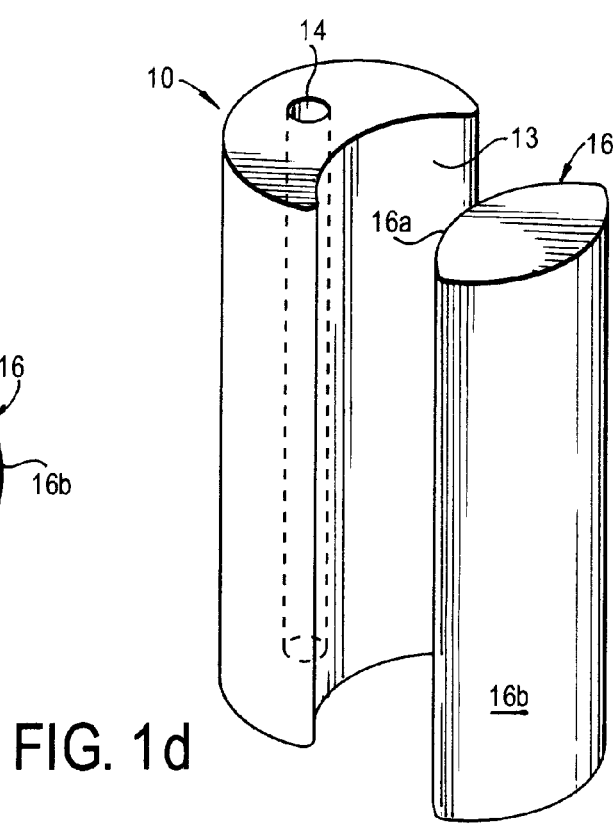
FIG. 1d illustrates another perspective of an exemplary boat bumper having an auxiliary bumper.

As illustrated in FIG. 1d, optional aperture 14 can extend through main body 10, such that a structure, such as a rope, for example, can pass therethrough and extend completely through the main body.

Figure 2A:
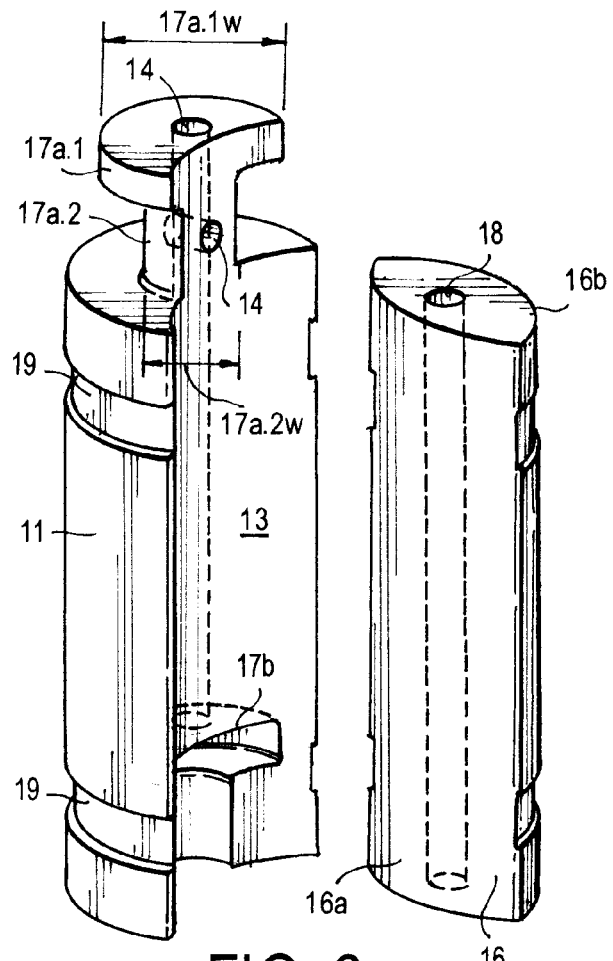
FIG. 2a illustrates an exemplary boat bumper having an optional male connector and an optional female cavity.
Figure 2B:
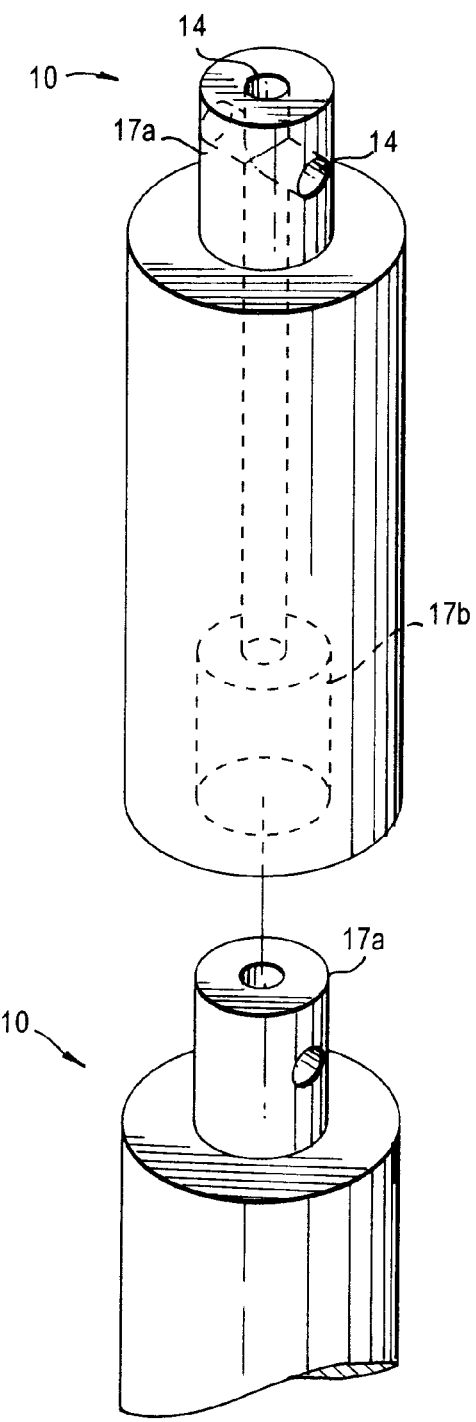
FIG. 2b illustrates another exemplary boat bumper having an optional male connector and an optional female cavity.

FIG. 2a illustrates another exemplary boat bumper according to the present invention, in which a boat bumper can optionally include a male connector, having a top 17a.1 and a neck 17a.2, and a female cavity 17b. In an exemplary aspect, a male connector of one bumper can engage the female cavity of another bumper to connect the bumpers together. In another exemplary aspect of the present invention, a male connector can be provided in any desired shape or shapes functionally compatible with the present invention; whilst a female cavity can be complementarily shaped to the male connector, such that the male connector can fit inside the female cavity. For example and not in limitation, as illustrated, top 17a.1 can have a top width 17a.1w, and neck 17a.2 can have neck width 17.a.2w less than the top width. In another exemplary aspect, when engaged with main body 10, auxiliary bumper 16 can abut a male connector of another bumper that is disposed within female cavity 17b, which can retain the male-female engagement. In a further exemplary aspect, as illustrated in FIG. 2b, male connector 17a can include at least one main body aperture 14, which can facilitate the retention of the male-female engagement via tying (via a rope, for example and not in limitation) of plural boat bumpers together. Also notably, as illustrated in FIG. 2a, auxiliary bumper 16 can optionally be provided with at least one auxiliary bumper aperture 18, which can optionally align with a main body aperture 14.

Figure 2C:
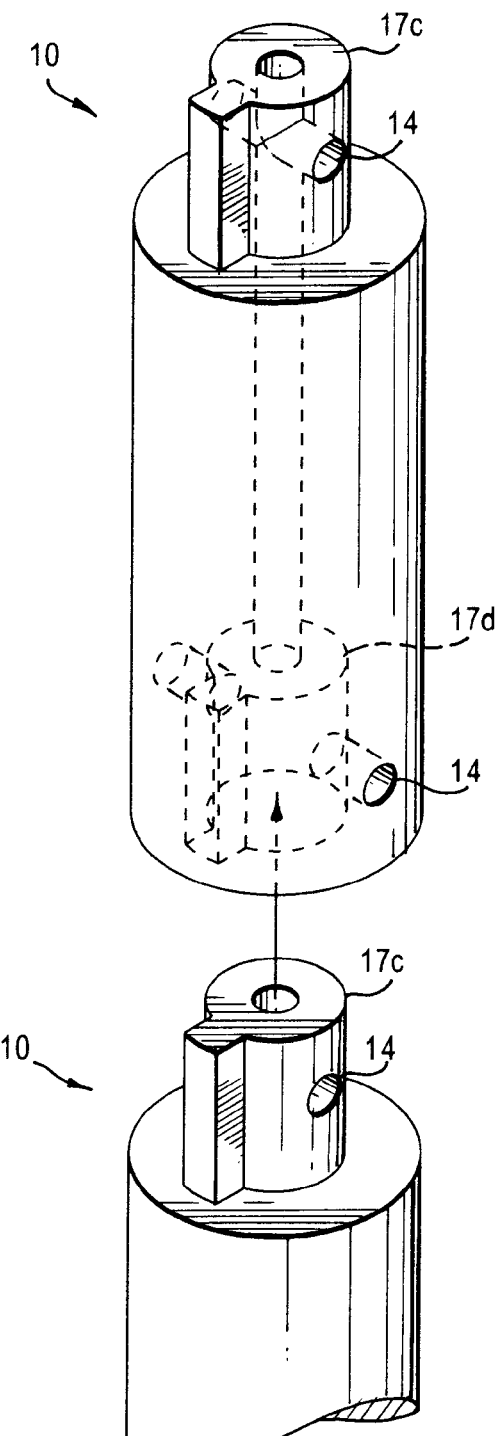
FIG. 2c illustrates an exemplary boat bumper having an optional keyed male connector.

Referring now to FIG. 2c, in another exemplary aspect of the present invention, male connector 17c can optionally be keyed, in that it includes a shape that resists rotation when within a complementarily shaped female cavity. Accordingly, when male connector 17c is engaged with female cavity 17d, the keyed shape of male connector 17c resists rotation with female cavity 17d via an abutment functionality. Also notably, FIG. 2c illustrates a laterally oriented main body aperture 14, which can allow for a structure, such as a rope, to pass therethrough to secure male connector 17c and female cavity 17d together.

Figure 2D:
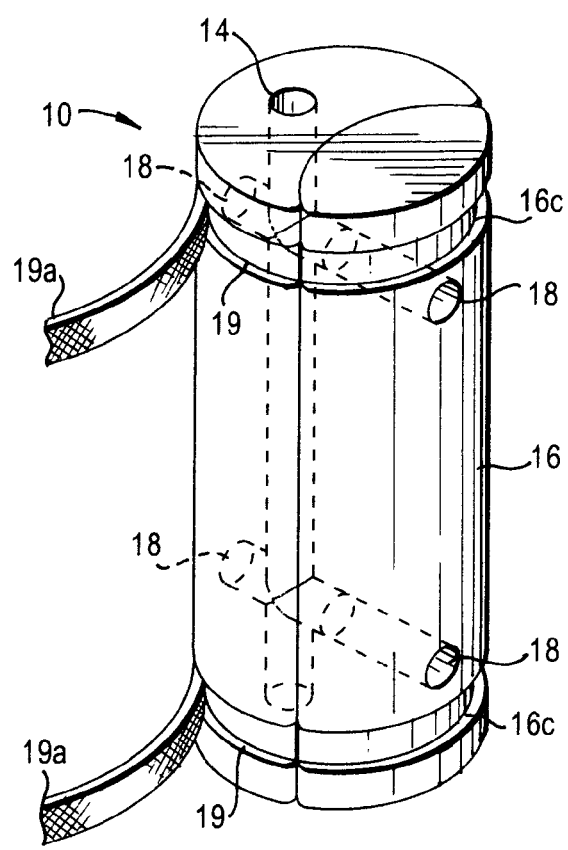
FIG. 2d illustrates an exemplary boat bumper having optional main body strap creases, optional auxiliary bumper strap creases, and optional straps for maintaining engagement of a main body and an auxiliary bumper.

Referring now to FIG. 2d, main body 10 can optionally include at least one main body strap crease 19, and/or auxiliary bumper 16 can include at least one auxiliary bumper strap crease 16c, which can optionally be aligned with a main body strap crease. Accordingly, strap creases 19, 16c can provide an indented area to assist in orienting a strap 19a, which can be wound around main body 10 and auxiliary bumper 16 to secure them together.

Figure 3A:
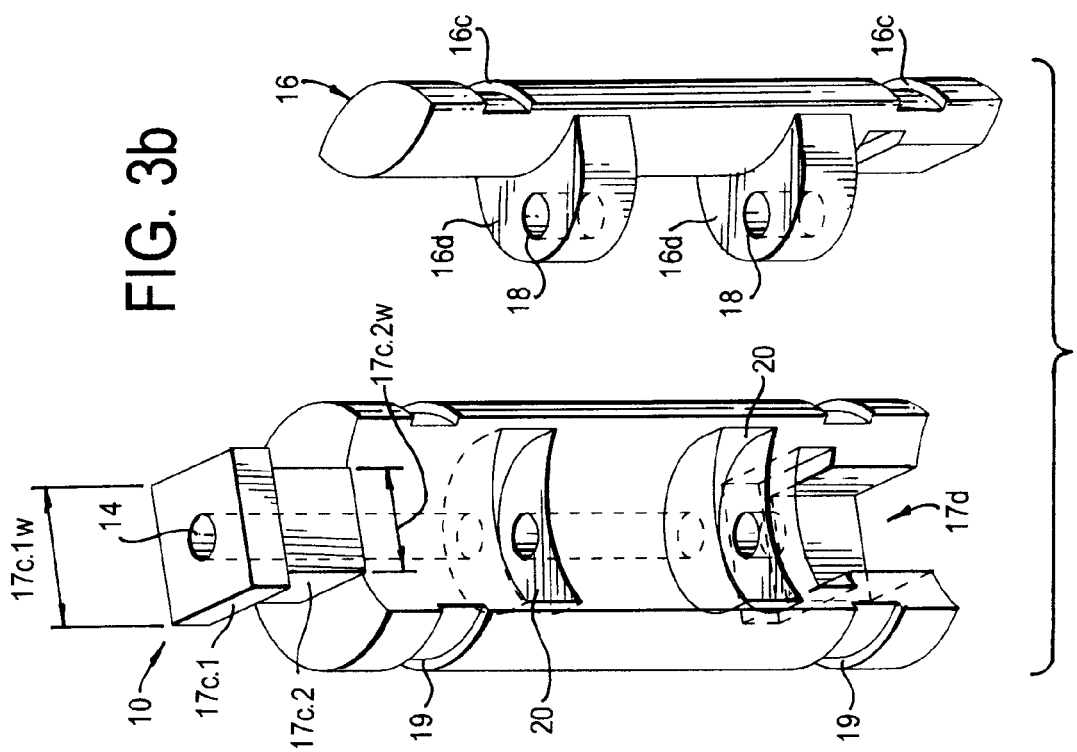
FIG. 3a illustrates an exemplary main body having optional extension cavities and an optional auxiliary bumper having optional auxiliary bumper extensions.

As illustrated in FIG. 3a, main body 10 can optionally include at least one extension cavity 20 and auxiliary bumper 16 can optionally include at least one auxiliary bumper extension 16d. Accordingly, when auxiliary bumper 16 is engaged with main body 10, auxiliary bumper extension 16d can fit within extension cavity 20 to provide a more resilient engagement that can resist movement in at least one direction. As also illustrated, auxiliary bumper extension 20 can optionally include at least one auxiliary bumper aperture 18, which can optionally align with main body aperture 14 such that a structure, such as a rope, for example and not in limitation, can pass therethrough to provide an enhanced engagement.

Figure 3B:
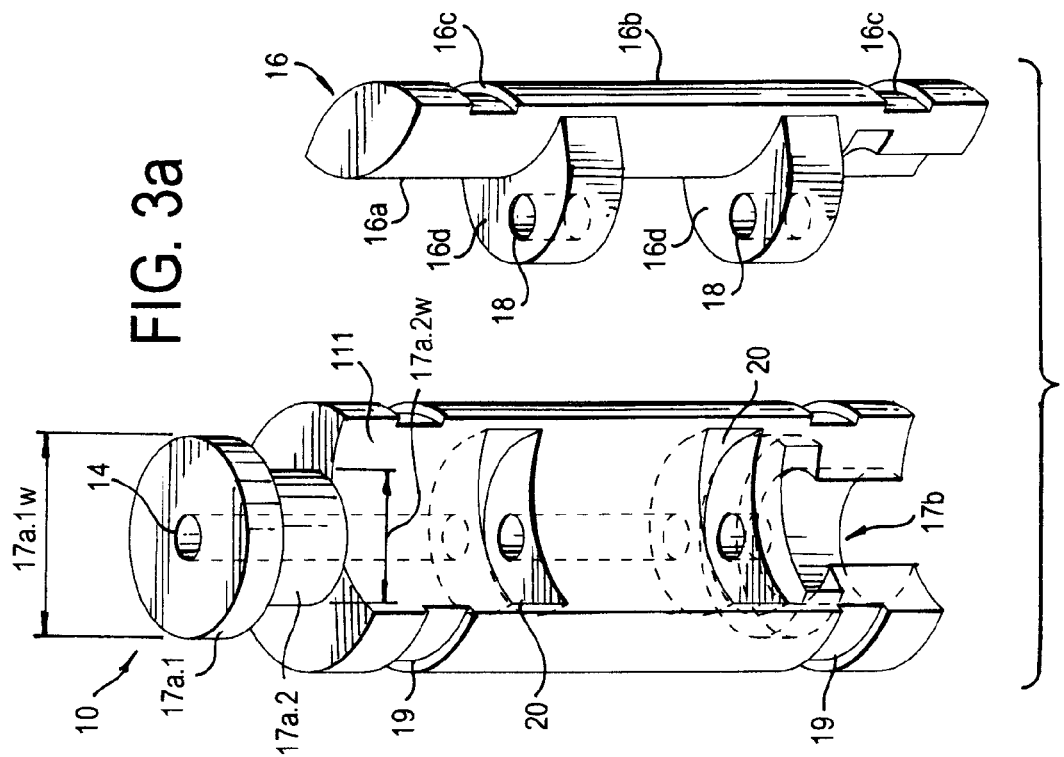
FIG. 3b illustrates an exemplary boat having an optional keyed male portion.
Figure 3C:
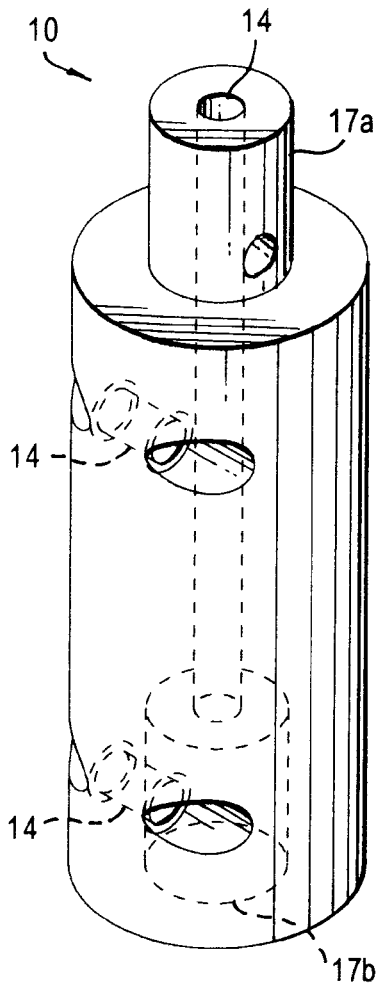
FIG. 3c illustrates an exemplary boat bumper having an optional male connector, optional female cavity, and optional main body apertures that are laterally disposed.

FIG. 3b illustrates an exemplary main body 10 having a male connector including a keyed top 17c.1 with a top width 17c.1w and a keyed neck 17c.2 with a neck width 17c.2w less than the top width. Notably, an optional male connector can be keyed via keyed top 17c.1 and/or keyed neck 17c.2, either of which can be keyed in at one direction. As illustrated in FIG. 3c, a main body 10 can optionally be provided with a pair of horizontally oriented main body apertures 14, which can allow two bumpers to be attached together in a lateral manner or a single bumper to attached to a nautical structure, via a tying structure, such as a rope (not shown), passing through apertures 14.

Figure 3D:
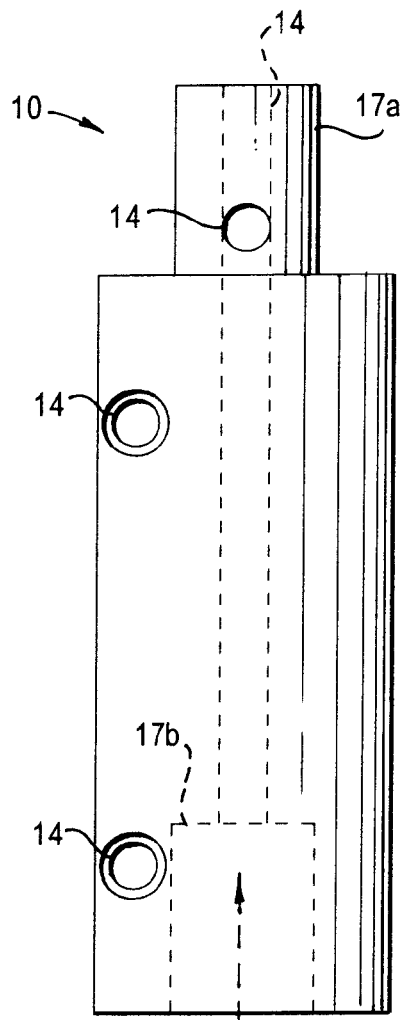
FIG. 3d illustrates an exemplary engagement of an exemplary boat bumper with another boat bumper.
Figure 3D:
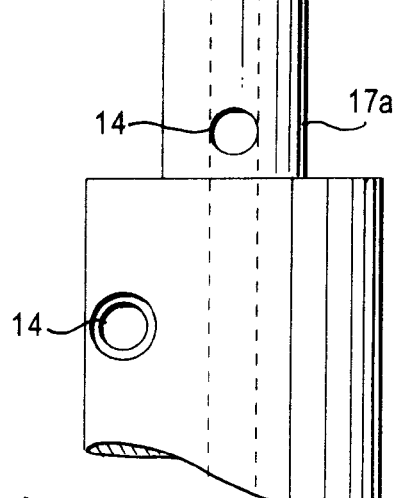

FIG. 3d illustrates yet another exemplary engagement of two bumpers. As illustrated, male connector 17a can be inserted into a female cavity 17b with a pair of optional horizontally oriented main body apertures 14 being adjacent thereto. Notably, provisioning of male connector 17a and female cavity 17b can allow engagement of several bumpers to provide an elongated series of bumpers.

Figure 3F:
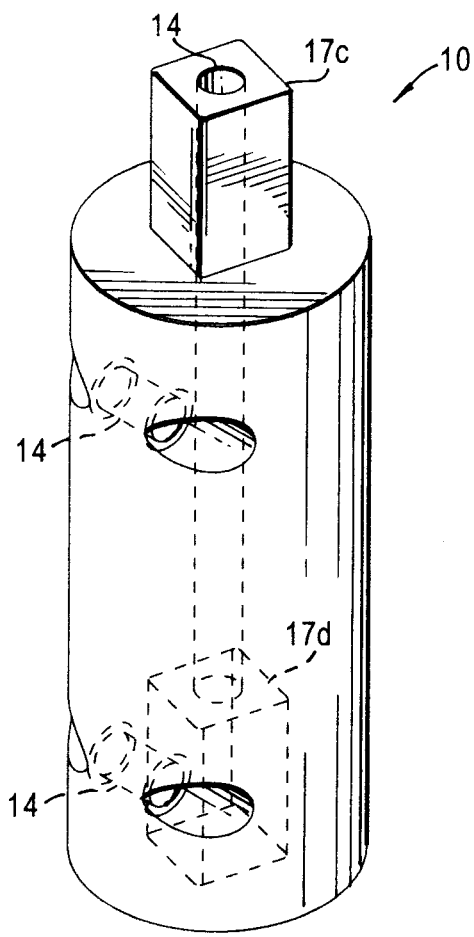
FIG. 3f illustrates an exemplary boat bumper having an optional multi-keyed male connector.
Figure 3G:
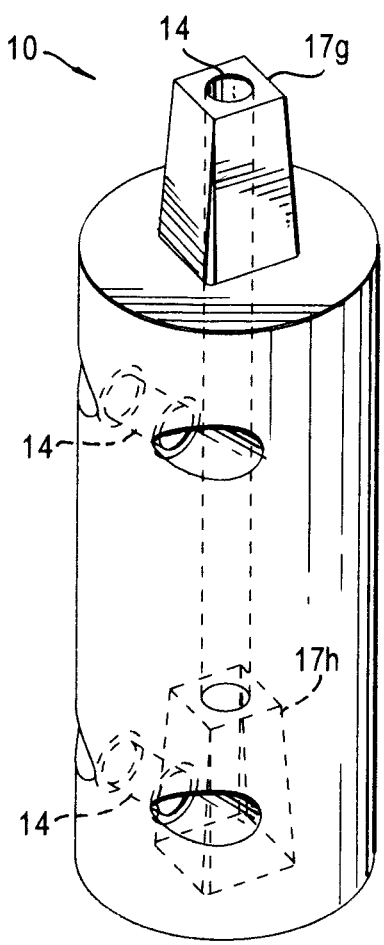
FIG. 3g illustrates an exemplary boat bumper having an optional keyed and tapered male connector.
Figure 3E:
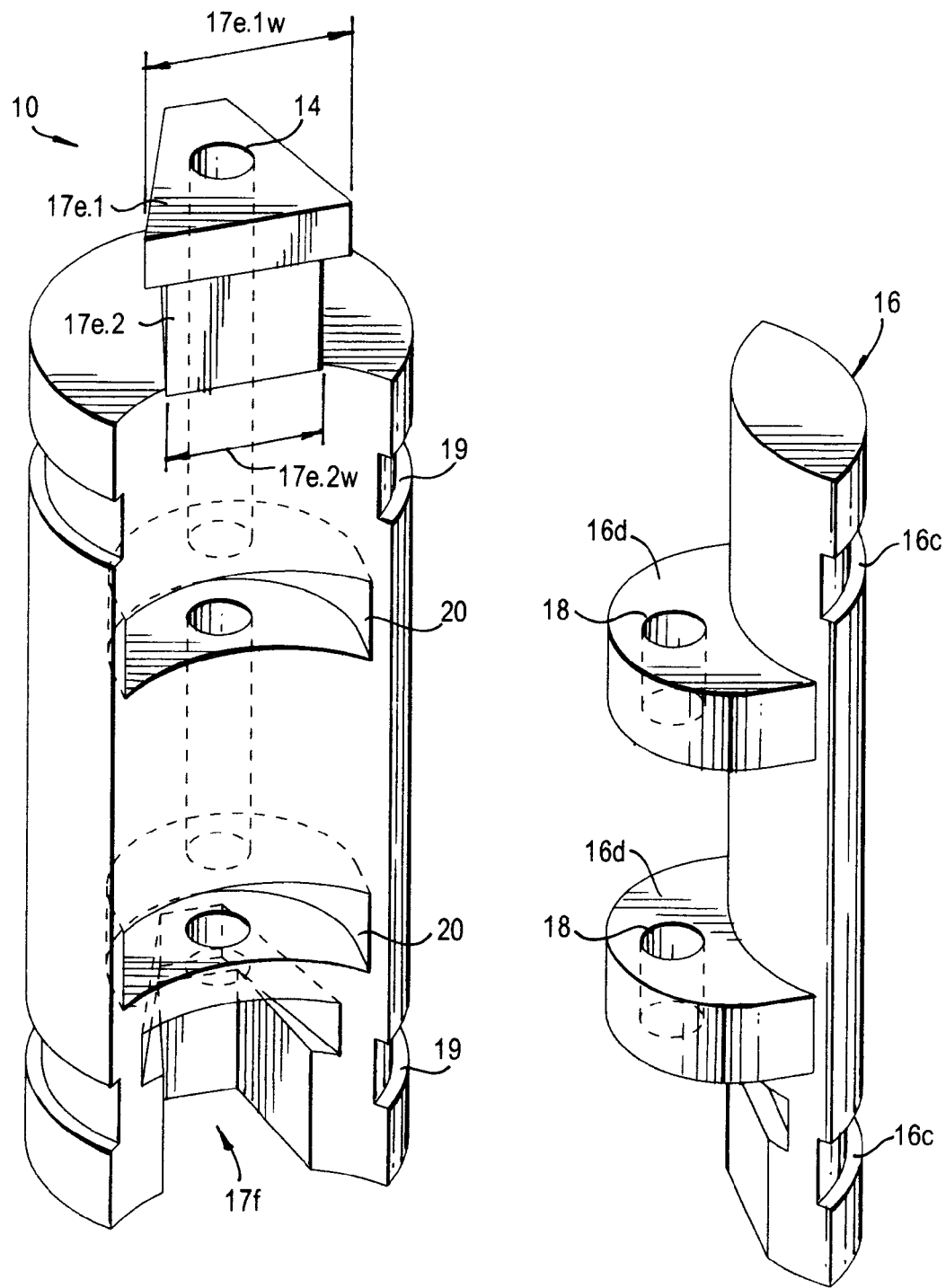
FIG. 3e illustrates an exemplary boat bumper having an optional tapered male connector and an optional auxiliary bumper.

FIG. 3e illustrates another exemplary main body 10 and auxiliary bumper 16, in which the main body includes an optional tapered male portion 17e. In an exemplary aspect, tapering of male portion 17e can be in any desired direction, and can be directed to facilitate its engagement with a female cavity 17f, as particular materials, such as certain plastics, can have high coefficients of friction, which can resist movement of male portion 17e against portions of main body 10 defining female cavity 17f.

FIG. 3f illustrates yet another exemplary main body 10 having a multi-keyed male portion 17c, while FIG. 3e illustrates that male portion 17g can be both keyed and tapered to the extent desired.

It should be noted that the present invention expressly contemplates reversal of any engagement features described herein, with the same being functional equivalents. Thus, for example, main body 10 can include auxiliary bumper extension 16d and auxiliary bumper 16 can include extension cavity 20.

It will be apparent to one of ordinary skill in the art that the manner of making and using the claimed invention has been adequately disclosed in the above-written description of the exemplary embodiments and aspects.

It should be understood, however, that the invention is not necessarily limited to the specific embodiments, aspects, arrangement, and components shown and described above, but may be susceptible to numerous variations within the scope of the invention.

Therefore, the specification and drawings are to be regarded in an illustrative and enabling, rather than a restrictive, sense.

Accordingly, it will be understood that the above description of the embodiments of the present invention are susceptible to various modifications, changes, and adaptations, and the same are intended to be comprehended within the meaning and range of equivalents of the appended claims.

Therefore, I claim:

1. A boat bumper configured for positioning between a nautical structure and a nautical vessel, comprising:
    a main body, formed of a flexible material, and having a concave portion, a convex portion, at least one main body aperture, at least one main body extension cavity, a male connector having a male shape, and a female cavity complementarily shaped to the male shape such that the male connector of another boat bumper fits within the female cavity to connect the boat bumpers together;
    an auxiliary bumper, formed of one of the flexible material and another flexible material, and having a first convex part, a second convex part, at least one auxiliary bumper aperture, and at least one auxiliary bumper extension that fits within the at least one main body extension cavity when said main body and said auxiliary bumper are engaged, the auxiliary bumper aperture extending through the at least one auxiliary bumper extension;
    wherein the at least one main body aperture extends through the male connector and to the female cavity, and said main body and said auxiliary bumper engage to form a macro bumper having the first convex part abutting the concave portion and the at least one auxiliary bumper aperture aligned with the at least one main body aperture.

2. The boat bumper of claim 1, wherein said main body includes at least one main body aperture that extends through said main body.

3. The boat bumper of claim 1, further comprising:
    an auxiliary bumper, formed of one of the flexible material and another flexible material, and having a first convex part and a second convex part;
    wherein said main body and said auxiliary bumper engage to form a macro bumper with the first convex part abutting the concave portion.

4. The boat bumper of claim 3, wherein said main body include at least one main body aperture and said auxiliary bumper includes at least one auxiliary bumper aperture that aligns with the at least one main body aperture when said main body and said auxiliary bumper are engaged.

5. The boat bumper of claim 1, wherein said main body includes at least one main body strap crease and said auxiliary bumper includes an auxiliary bumper strap crease that aligns with the main body strap crease when said main body and said auxiliary bumper are engaged.

6. The boat bumper of claim 1, wherein the male shape is keyed.

7. The boat bumper of claim 6, wherein the male shape is tapered in at least one direction.

8. The boat bumper of claim 1, wherein the male shape is tapered in at least one direction.

9. The boat bumper of claim 1, wherein the male connector includes a male connector top having a top width and a male connector neck having a neck width less than the top width.

10. The boat bumper of claim 9, wherein at least one of the male connector top and the male connector neck is keyed.

11. The boat bumper of claim 10, wherein the at least one of the male connector top and the male connector neck is tapered in at least one direction.

12. The boat bumper of claim 9, wherein at least one of the male connector top and the male connector neck is tapered in at least one direction.

\* \* \* \* \*